(12) United States Patent
Kohno

(10) Patent No.: US 10,605,189 B2
(45) Date of Patent: Mar. 31, 2020

(54) COMMUNICATION SYSTEM, FLOW MEASURING DEVICE AND CONTROL DEVICE

(71) Applicant: DENSO CORPORATION, Kariya, Aichi-pref. (JP)

(72) Inventor: Yasushi Kohno, Kariya (JP)

(73) Assignee: DENSO CORPORATION, Kariya (JP)

( * ) Notice: Subject to any disclaimer, the term of this patent is extended or adjusted under 35 U.S.C. 154(b) by 622 days.

(21) Appl. No.: 14/922,270

(22) Filed: Oct. 26, 2015

(65) Prior Publication Data

US 2016/0146143 A1 May 26, 2016

(30) Foreign Application Priority Data

Nov. 21, 2014 (JP) ................. 2014-236905

(51) Int. Cl.
*F02D 41/18* (2006.01)
*F02P 9/00* (2006.01)
(Continued)

(52) U.S. Cl.
CPC ............. *F02D 41/182* (2013.01); *F02P 9/00* (2013.01); *G01F 1/6842* (2013.01); *G01F 5/00* (2013.01);
(Continued)

(58) Field of Classification Search
CPC ......... F02D 2041/281; F02D 2041/285; F02D 2041/286; F02D 2041/288; G01F 15/02;
(Continued)

(56) References Cited

U.S. PATENT DOCUMENTS 4,383,515 A * 5/1983 Higashiyama ...... F02D 41/0087
123/478
5,517,971 A 5/1996 Nishimura et al.
(Continued)

FOREIGN PATENT DOCUMENTS

JP H06-308142 11/1994
JP 2002227713 A * 8/2002
(Continued)

*Primary Examiner* — Jacob M Amick
*Assistant Examiner* — Michael A Kessler
(74) *Attorney, Agent, or Firm* — Nixon & Vanderhye P.C.

(57) ABSTRACT

A communication system includes a flow measuring device and a control device. The flow measuring device includes a flow sensor that generates a flow rate signal which is a signal in accordance with a flow rate of intake air drawn into an internal-combustion engine. The flow measuring device transmits the flow rate signal. The control device receives the flow rate signal and performs at least one of injection control of fuel to be supplied to the engine and ignition control at each cylinder of the engine based on the received flow rate signal. The flow measuring device includes a measurement-side transmitting part that transmits various signals by wireless communication, and transmits the flow rate signal by the measurement-side transmitting part. The control device includes a control-side receiving part that receives the various signals by the wireless communication, and receives the flow rate signal by the control-side receiving part.

18 Claims, 5 Drawing Sheets

(51) Int. Cl.
*G01F 15/04* (2006.01)
*G01F 15/02* (2006.01)
*F02M 35/10* (2006.01)
*F02D 41/28* (2006.01)
*G01F 1/684* (2006.01)
*G01F 15/06* (2006.01)
*G01F 5/00* (2006.01)

(52) U.S. Cl.
CPC .......... *G01F 15/022* (2013.01); *G01F 15/043* (2013.01); *G01F 15/066* (2013.01); *F02D 2041/285* (2013.01); *F02M 35/10386* (2013.01)

(58) Field of Classification Search
CPC ...... G01F 15/022; G01F 15/04; G01F 15/043; G01F 5/00; F02M 35/10373; F02M 35/1038; B60C 23/0408
USPC ...... 123/447, 494, 539.1; 73/114.32–114.34; 702/45, 50; 701/103
See application file for complete search history.

(56) References Cited

U.S. PATENT DOCUMENTS

| | | | |
|---|---|---|---|
| 6,997,162 B2* | 2/2006 | Hirayama | F02D 11/107 123/399 |
| 7,103,460 B1* | 9/2006 | Breed | B60C 23/0408 701/29.1 |
| 7,383,815 B2* | 6/2008 | Hirayama | F02D 11/107 123/399 |
| 7,499,819 B2* | 3/2009 | Kanke | G01F 1/6965 702/100 |
| 7,613,582 B2* | 11/2009 | Kanke | G01F 1/6845 702/100 |
| 7,623,976 B2* | 11/2009 | Gysling | G01F 1/363 702/100 |
| 7,774,130 B2* | 8/2010 | Pepper | B60W 40/12 340/439 |
| 8,176,936 B2* | 5/2012 | Naganuma | F16K 37/00 137/557 |
| 8,833,390 B2* | 9/2014 | Ball | G01F 15/14 137/552 |
| 2003/0101809 A1* | 6/2003 | Matsumura | F02D 41/187 73/204.15 |
| 2003/0146758 A1* | 8/2003 | Koike | G01F 1/684 324/453 |
| 2007/0088511 A1* | 4/2007 | Yamamoto | G01F 1/584 702/45 |
| 2007/0179728 A1* | 8/2007 | Kanke | G01F 1/6965 702/100 |
| 2011/0246047 A1 | 10/2011 | Smith et al. | |
| 2012/0192632 A1* | 8/2012 | Matsumoto | G01F 1/00 73/114.31 |
| 2013/0036806 A1 | 2/2013 | Kohno | |
| 2014/0085068 A1 | 3/2014 | Kosugi | |
| 2014/0190270 A1* | 7/2014 | Suzuki | G01F 1/696 73/861.03 |
| 2014/0366607 A1* | 12/2014 | Tsujii | F02D 41/2432 73/1.16 |

FOREIGN PATENT DOCUMENTS

JP 2003-239797 8/2003
JP 2006037902 A * 2/2006

* cited by examiner

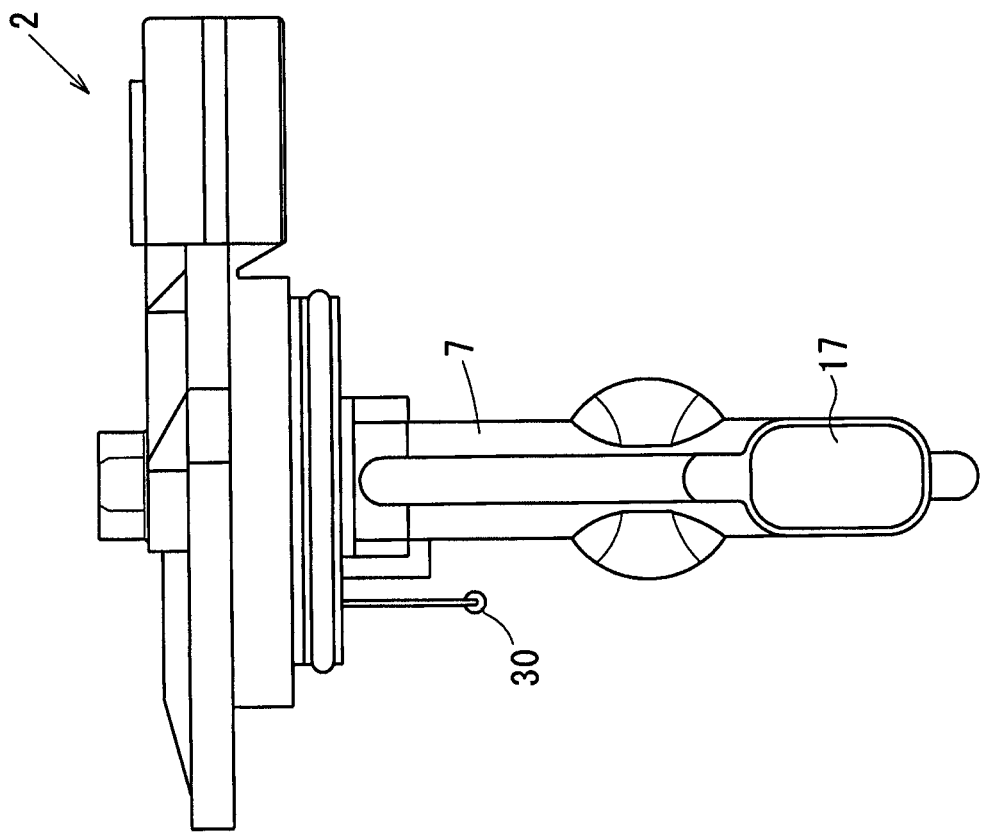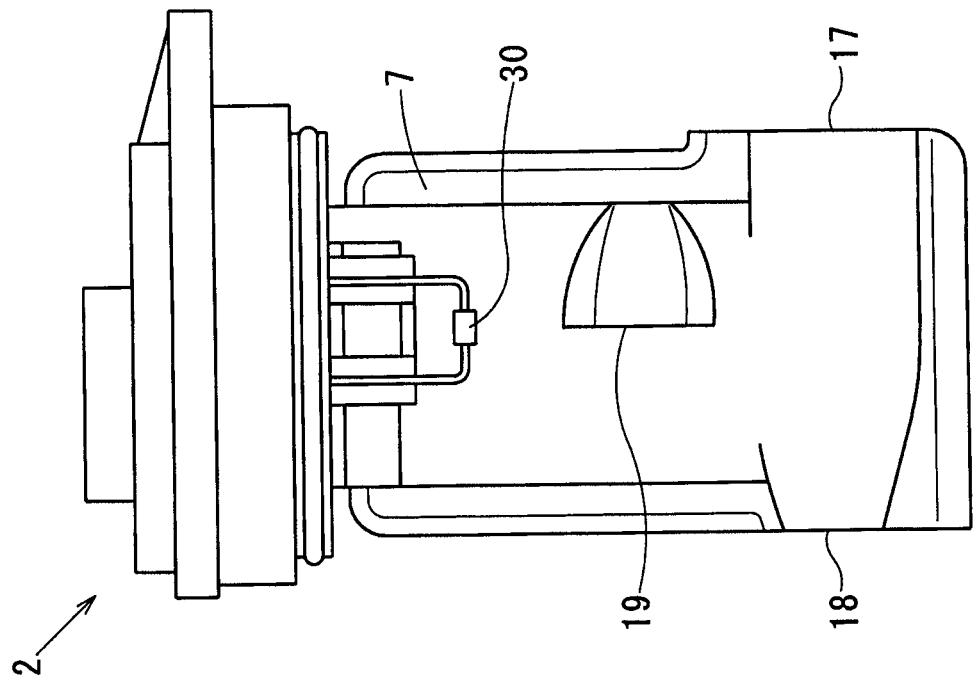

COMMUNICATION SYSTEM, FLOW MEASURING DEVICE AND CONTROL DEVICE

CROSS REFERENCE TO RELATED APPLICATION

This application is based on Japanese Patent Application No. 2014-236905 filed on Nov. 21, 2014, the disclosure of which is incorporated herein by reference.

TECHNICAL FIELD

The present disclosure relates to a flow measuring device that measures a flow rate of intake air drawn into an internal combustion engine (which may hereinafter be referred to as an intake air amount), and a communication system for communication with a control device that performs various controls based on the intake air amount.

BACKGROUND

Conventionally, injection control of fuel to be supplied to an internal combustion engine, and ignition control at each cylinder of the engine are performed based on the intake air amount and other parameters by an electronic control unit (control device). The control device obtains the intake air amount based on a signal transmitted from a flow measuring device provided separately from the control device (see, e.g., JPH06-308142A).

The flow measuring device is disposed in a flow passage for intake air (hereinafter referred to as an air intake duct), and produces a signal in accordance with the intake air amount in the air intake duct (hereinafter referred to as a flow rate signal) by a flow sensor. The flow measuring device transmits the generated flow rate signal to the control device. The control device obtains the intake air amount based on the flow rate signal received from the flow measuring device, and calculates fuel injection timing, a fuel injection period, ignition timing, and so forth using the obtained intake air amount to perform the injection and ignition of fuel.

The transmission of the flow rate signal from the flow measuring device to the control device is performed by wire communication using a harness. For this reason, noise generated in devices around the harness may be superimposed on the flow rate signal. Based on the flow rate signal on which the noise is superimposed, the control device may obtain the intake air amount as an incorrect numerical value.

Accordingly, such a configuration that noise is not easily superimposed on the flow rate signal is required for a communication system between the flow measuring device and the control device. In a vehicle in recent years, the number of noise generating sources tends to increase in line with progress of electronic control of devices disposed therein. From this point of view as well, there is a higher possibility that the noise is superimposed on the flow rate signal, and there is a strong demand for restraint of the noise superimposition.

According to JP2013-036892A, there is also disclosed a configuration of a flow measuring device that generates a signal (temperature signal, humidity signal, or pressure signal) in accordance with, for example, temperature, humidity, pressure of intake air in addition to the intake air amount and transmits the signal to a control device. When the number of signals to be transmitted increases as described above, the number of terminals and harnesses for transmission to the control device also increases to cause a cost increase.

SUMMARY

The present disclosure addresses at least one of the above issues. Thus, it is an objective of the present disclosure to firstly provide a configuration whereby noise is not easily superimposed on a flow rate signal for a communication system between a flow measuring device and a control device, and to secondly prevent a cost increase due to increase in the number of terminals and harnesses even though the number of signals that should be transmitted from the flow measuring device to the control device increases.

To achieve the objective of the present disclosure, there is provided a communication system for a vehicle, including a flow measuring device and a control device. The flow measuring device includes a flow sensor that generates a flow rate signal which is a signal in accordance with a flow rate of intake air drawn into an internal combustion engine. The flow measuring device transmits the flow rate signal. The control device receives the flow rate signal and performs at least one of injection control of fuel to be supplied to the engine and ignition control at each cylinder of the engine based on the received flow rate signal. The flow measuring device further includes a measurement-side transmitting part that transmits various signals by wireless communication, and transmits the flow rate signal by the measurement-side transmitting part. The control device includes a control-side receiving part that receives the various signals by the wireless communication, and receives the flow rate signal by the control-side receiving part.

To achieve the objective of the present disclosure, there is also provided a flow measuring device constituting the communication system.

To achieve the objective of the present disclosure, there is further provided a control device constituting the communication system.

BRIEF DESCRIPTION OF THE DRAWINGS

The above and other objects, features and advantages of the present disclosure will become more apparent from the following detailed description made with reference to the accompanying drawings. In the drawings:

FIG. 2A is a side view illustrating a flow measuring device in accordance with the first embodiment;

FIG. 2B is a rear view illustrating the flow measuring device of the first embodiment;

DETAILED DESCRIPTION

Embodiments will be described below. The embodiment illustrates a specific example, and it goes without saying that the present disclosure is not limited to the embodiments.

(First Embodiment)

Figure 1:
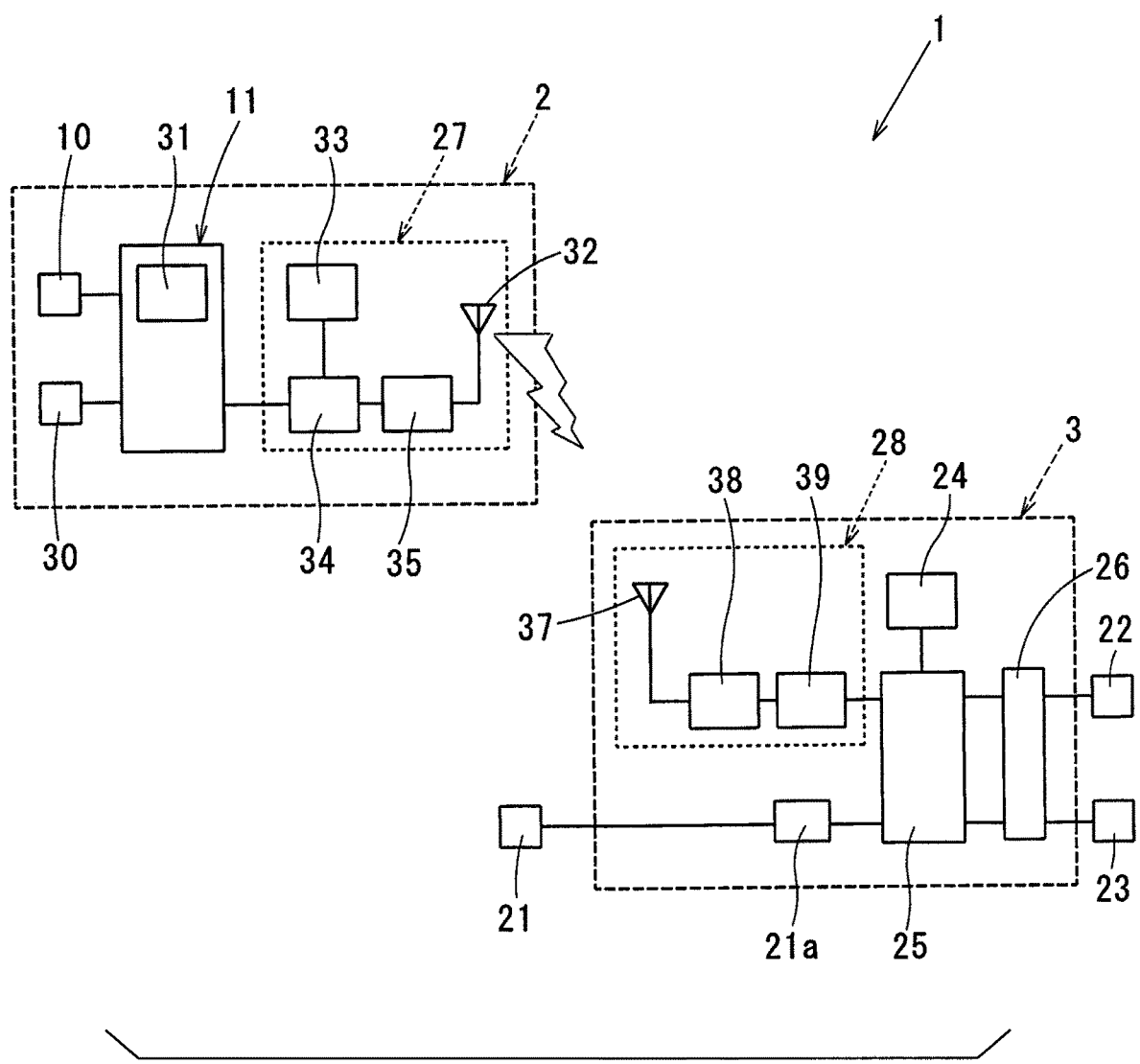
FIG. 1 is a diagram illustrating a configuration of a communication system in accordance with a first embodiment.

A configuration of a communication system 1 of a first embodiment will be described with reference to FIGS. 1 to 3. The communication system 1 is disposed in an engine compartment of a vehicle (not shown), and includes a flow measuring device 2 and a control device 3 as described below. Specifically, the flow measuring device 2 measures a flow rate of intake air (intake air amount) drawn into an internal combustion engine (not shown). The flow measuring device 2 includes a flow sensor which produces a signal (flow rate signal) in accordance with the intake air amount, and transmits the generated flow rate signal to an external device. The control device 3 is mainly an electronic control unit that controls operation of the engine (the control device 3 is hereinafter referred to as an ECU 3). The control device 3 receives the flow rate signal, obtains the intake air amount based on the flow rate signal, and performs various controls based on the obtained intake air amount.

Figure 3:
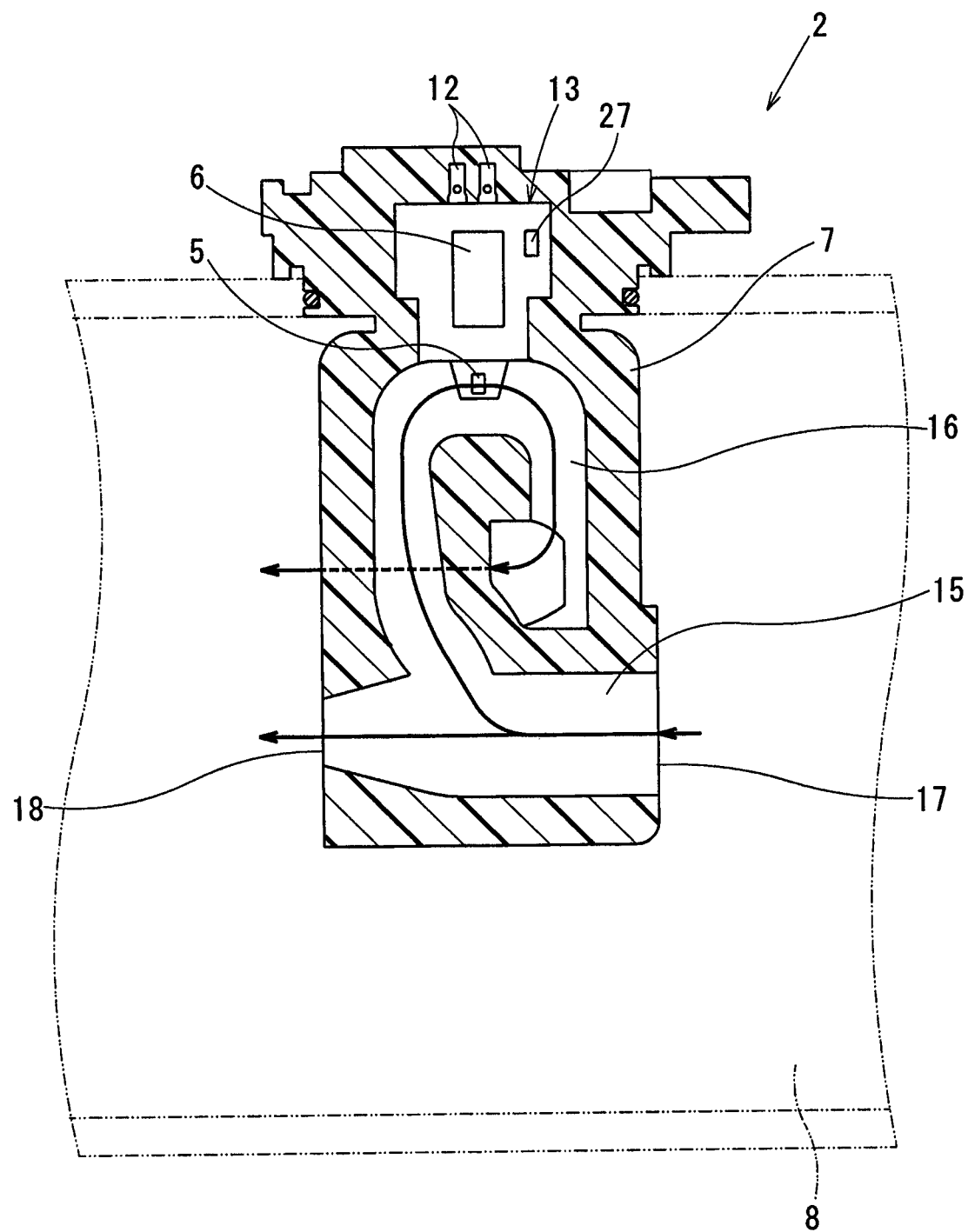
FIG. 3 is a diagram illustrating an internal configuration of the flow measuring device of the first embodiment.

For example, the flow measuring device 2 includes a sensor chip 5, a circuit chip 6, and a housing 7 made of resin which are illustrated in FIG. 3. The flow measuring device 2 is disposed in a flow passage for intake air (hereinafter referred to as an air intake duct 8), and generates the flow rate signal in accordance with the intake air amount in the air intake duct 8.

The sensor chip 5 generates the flow rate signal, and is a part corresponding to the flow sensor. The sensor chip 5 is provided by forming a heat sensitive resistor film on a surface of a substrate having a shape of a rectangular flat plate to configure a circuit. The sensor chip 5 produces a signal according to a flow rate of gas using heat transfer between the chip 5 and the gas flowing along the substrate surface (the circuit provided at the sensor chip 5 is hereinafter referred to as a flow detection circuit 10).

The circuit chip 6 includes a circuit for performing predetermined processing on the signal obtained from the sensor chip 5 (the circuit provided at the circuit chip 6 is hereinafter referred to as a processing circuit 11). The flow detection circuit 10 and the processing circuit 11 are connected together by a bonding wire (not shown). The sensor chip 5 and the circuit chip 6 are configured as a single assembly 13 along with terminals 12 and a predetermined resin material. A surface of the sensor chip 5 is exposed into the air at the assembly 13.

For example, the housing 7 includes a first bypass flow passage 15 which takes in a part of intake air from the air intake duct 8 and through which this intake air is bypassed, and a second bypass flow passage 16 through which the air flowing in the first bypass flow passage 15 is further bypassed. The sensor chip 5 is disposed in the second bypass flow passage 16. By heat transfer between the gas flowing through the second bypass flow passage 16 and the sensor chip 5, the flow measuring device 2 generates a signal in accordance with a flow rate of gas in the second bypass flow passage 16 as a flow rate signal.

The first bypass flow passage 15 makes the intake air taken in through a take-in port 17 flow straight generally parallel to the flow in the air intake duct 8, and returns the intake air into the air intake duct 8 through a discharge port 18. The first bypass flow passage 15 makes foreign substances contained in the taken-in gas flow straight to prevent the foreign substances form flowing toward the sensor chip 5. The second bypass flow passage 16 make the flow of the intake air taken in from the first bypass flow passage 15 flow around, and returns the intake air into the air intake duct 8 through a discharge port 19 (see FIG. 2A) provided separately from the discharge port 18. The second bypass flow passage 16 has a function of enhancing the accuracy of the signal by making a distance traveled by the intake air longer than at the time of the air flowing straight. The sensor chip 5 is disposed at a position where the flow of intake air in the second bypass flow passage 16 is in an opposite direction from the flow in the air intake duct 8.

The ECU 3 receives the flow rate signal, and controls at least one of injection control of the fuel that is to be supplied to the engine and ignition control in each cylinder of the engine based on the received flow rate signal. As will be hereinafter described, the flow rate signal is sent or received by wireless communication. The ECU 3 receives a signal transmitted from an other measuring device 21 than the flow measuring device 2 (see FIG. 1), and calculates fuel injection timing, a fuel injection period, ignition timing, and so forth using also the signal transmitted from the other measuring device 21 in combination. Based on the calculated injection timing, injection period, ignition timing, and so forth, the ECU 3 gives a command signal to each of an injector 22 and an ignition device 23 to perform fuel injection and ignition.

The other measuring device 21 for transmitting a signal to the ECU 3 is, for example, a throttle opening sensor, a water temperature sensor, a crank angle sensor, or a knock sensor. The other measuring device 21 transmits the signal through wire communication using a harness, and the ECU 3 receives the signal by an input circuit 21a corresponding to each signal. The operation for calculating the injection timing, injection period, ignition timing, and so forth is performed in a central processing unit (CPU) 25 in accordance with various flows of control stored in a storage means 24, such as a read-only memory (ROM) or an electrically erasable programmable read-only memory (EEPROM). Furthermore, the command signal is given to the injector 22 and the ignition device 23 via an output circuit 26, for example.

Characteristics of the communication system 1 will be described below. As illustrated in FIG. 1, the flow measuring device 2 includes a transmitting part (measurement-side transmitting part) 27 for transmitting various signals by wireless communication, and transmits the flow rate signal by the transmitting part 27. The ECU 3 includes a receiving part (control-side receiving part) 28 for receiving the various signals by wireless communication, and receives the flow rate signal by the receiving part 28. The flow measuring device 2 includes a temperature sensor 30 that generates a temperature signal which is a signal in accordance with the temperature of intake air, and transmits the temperature signal by the transmitting part 27. The ECU 3 receives the temperature signal by the receiving part 28.

The flow measuring device 2 includes a storage part 31 for storing flow rate output characteristics that indicate a correlation between the value expressing a level of the flow rate signal and the value of the flow rate (intake air amount). The flow measuring device 2 transmits a characteristic signal which is a signal indicating the flow rate output characteristics by the transmitting part 27, and the ECU 3 receives the characteristic signal by the receiving part 28.

The flow measuring device 2 transmits an identifying signal for identifying the flow measuring device 2 for each individual piece by the transmitting part 27. The identifying signal is received by a reception destination having the strongest communication intensity (in the present embodiment, the reception destination having the strongest communication intensity is the ECU 3 as will be hereinafter described).

Characteristics of the above description will be explained in detail below. The transmitting part 27 is a transmitter that is incorporated into the assembly 13 together with the sensor chip 5 and the circuit chip 6 in the flow measuring device 2 (see FIG. 3: the transmitting part 27 may hereinafter be referred to as a transmitter 27). The transmitter 27 includes an antenna 32, a transmitting circuit 33, a modulation circuit 34, and an amplifying circuit 35 which will be described below.

The transmitting circuit 33 produces a carrier signal (e.g., a radio frequency (RF) signal having a frequency in a band of 315 MHz). The modulation circuit 34 modulates the carrier signal using data on the flow rate signal, temperature signal and characteristic signal and data on the identifying signal which are sent from the processing circuit 11, and produces a transmission signal including the flow rate signal, temperature signal, characteristic signal, and identifying signal. A method of amplitude shift keying modulation (ASK), frequency modulation (FM), frequency shift keying modulation (FSK), phase modulation (PM), or phase shift keying modulation (PSK), for example, can be employed as the modulation method.

The temperature sensor 30 is, for example, a thermistor having a lead wire that is disposed outside the housing 7 as illustrated in FIGS. 2A and 2B, and directly detects the temperature of intake air flowing through the air intake duct 8. The temperature signal generated at the temperature sensor 30 is outputted to the processing circuit 11, so that a predetermined processing is performed on the signal, and then the signal is sent to the modulation circuit 34. Because the flow rate signal and the temperature signal are transmitted by wireless communication, the terminals 12 necessary for the flow measuring device 2 are two: a terminal for power and a terminal for grounding (see FIG. 3).

The storage part 31 is, for example, a memory such as a ROM or EEPROM provided for the circuit chip 6. The individual identification information and the flow rate output characteristics are stored in the storage part 31 as data unique to each individual piece of the flow measuring device 2. The flow rate output characteristics may be prepared based on data obtained by calibration of the flow measuring device 2 in a particular flow passage for calibration, or may be prepared based on data obtained with the flow measuring device 2 attached to the air intake duct 8.

The amplifying circuit 35 amplifies the transmission signal generated at the modulation circuit 34, and the amplified transmission signal is transmitted by wireless communication through the antenna 32. The transmission signal transmitted from the antenna 32 is received by the reception destination having the strongest communication intensity, and the ECU 3 is set as the reception destination having the strongest communication intensity. Thus, the transmission signal of the flow measuring device 2 is received by the ECU 3.

The receiving part 28 is a receiver provided for the ECU 3 (the receiving part 28 may hereinafter be referred to as a receiver 28). The receiver 28 includes an antenna 37, a receiving circuit 38, and a receive buffer 39 which will be described below. The receiving circuit 38 receives a signal transmitted by wireless communication, takes out data through demodulation processing, and outputs the data to the receive buffer 39. The antenna 37 is connected to the receiving circuit 38, being matched with the same frequency as a transmitting frequency of the flow measuring device 2. The antenna 37 receives the transmission signal transmitted from the flow measuring device 2, and sends the signal to the receiving circuit 38.

Accordingly, from the parts of the received transmission signal, respectively including the flow rate signal, temperature signal, characteristic signal, and identifying signal, the receiving circuit 38 takes out the data on the flow rate, temperature, flow rate output characteristics, and individual identification information, and outputs the data to the receive buffer 39. The receive buffer 39 temporarily stores the data outputted from the receiving circuit 38, and the stored data is outputted to the CPU 25 according to instructions from the CPU 25.

Effects of the first embodiment will be described below. in the communication system 1 of the first embodiment, the flow measuring device 2 includes the transmitter 27 that transmits a signal by wireless communication, and transmits the flow rate signal by the transmitter 27; and the ECU 3 includes the receiver 28 that receives a signal by wireless communication, and receives the flow rate signal by the receiver 28.

As a result, the flow rate signal can be transmitted from the flow measuring device 2 and received by the ECU 3 by wireless communication. Consequently, for example, noise generated by another device disposed in the engine compartment is not superimposed on the flow rate signal. Accordingly, such a configuration that noise is not superimposed on the flow rate signal can be provided in the communication system 1. Moreover, terminals and harnesses required in the case of transmission and reception of the flow rate signal by wire communication are made unnecessary, thereby reducing costs. In addition, the flow rate signal can be received without providing an input circuit for inputting the flow rate signal at the ECU 3, and further reduction of cost can thus be achieved.

The flow measuring device 2 includes the temperature sensor 30, and transmits the temperature signal by the transmitter 27; and the ECU 3 receives the temperature signal by the receiver 28. Accordingly, the temperature signal as well as the flow rate signal can be transmitted from the flow measuring device 2 and received by the ECU 3 by wireless communication. As a consequence, such a configuration that noise is not superimposed on the temperature signal can be provided in the communication system 1.

Terminals and harnesses required in the case of transmission and reception of the temperature signal by wire communication are made unnecessary, so that a cost increase due to the increase in number of terminals and harnesses can be prevented. Moreover, the temperature signal can be received without providing an input circuit for inputting the temperature signal at the ECU 3. Accordingly, even though the number of signals that are to be transmitted from the flow measuring device 2 to the ECU 3 increases to two, a cost increase due to the increase in number of input circuits can be prevented.

The flow measuring device 2 includes the storage part 31 for storing the flow rate output characteristics which are unique to each individual piece, and transmits the characteristic signal by the transmitter 27; and the ECU 3 receives the characteristic signal by the receiver 28. Consequently, the ECU 3 can obtain the flow rate output characteristics for each individual piece of the flow measuring device 2. As a result, a more highly accurate numerical value for the intake air amount can be obtained for example, by correcting the flow rate signal based on the obtained flow rate output characteristics. Moreover, a highly accurate numerical value for the intake air amount can be obtained without storing the flow rate output characteristics for each individual piece of the flow measuring device 2 on the ECU 3-side. Accordingly, a highly accurate numerical value for the intake air amount can be obtained without using much of memory capacity in the storage part 24 of the ECU 3 for storage of the flow rate output characteristics.

Additionally, the flow measuring device 2 transmits the identifying signal existing for each individual piece of the flow measuring device 2 by the transmitter 27, and the identifying signal is received by the ECU 3 which is the reception destination having the strongest communication intensity. As a consequence, for example, after repair or replacement of the flow measuring device 2 is carried out in the vehicle, pairing between the flow measuring device 2 and the ECU 3 can reliably be performed.

(Second Embodiment)

Figure 4:
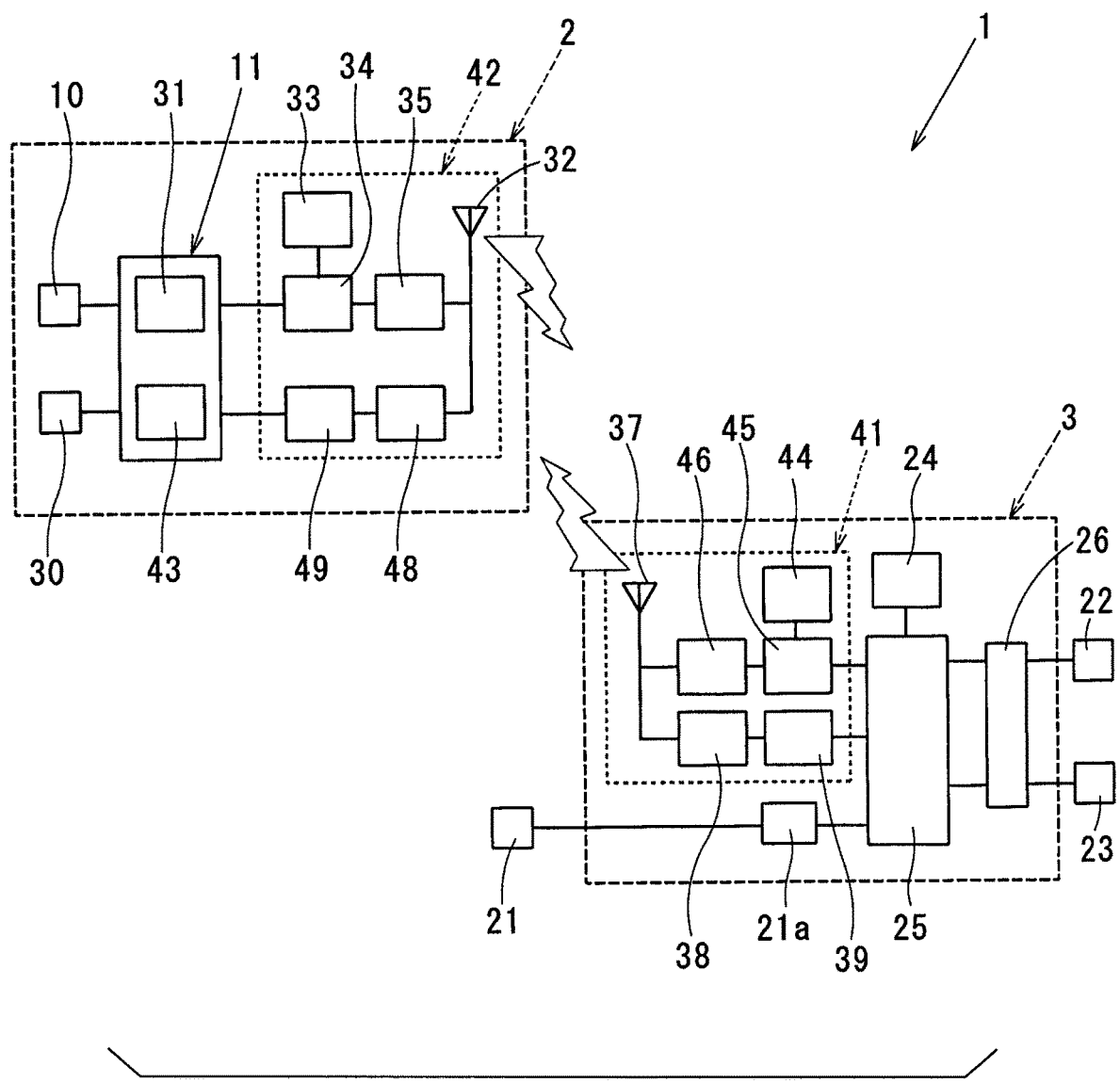
FIG. 4 is a diagram illustrating a configuration of a communication system in accordance with a second embodiment.
Figure 5:
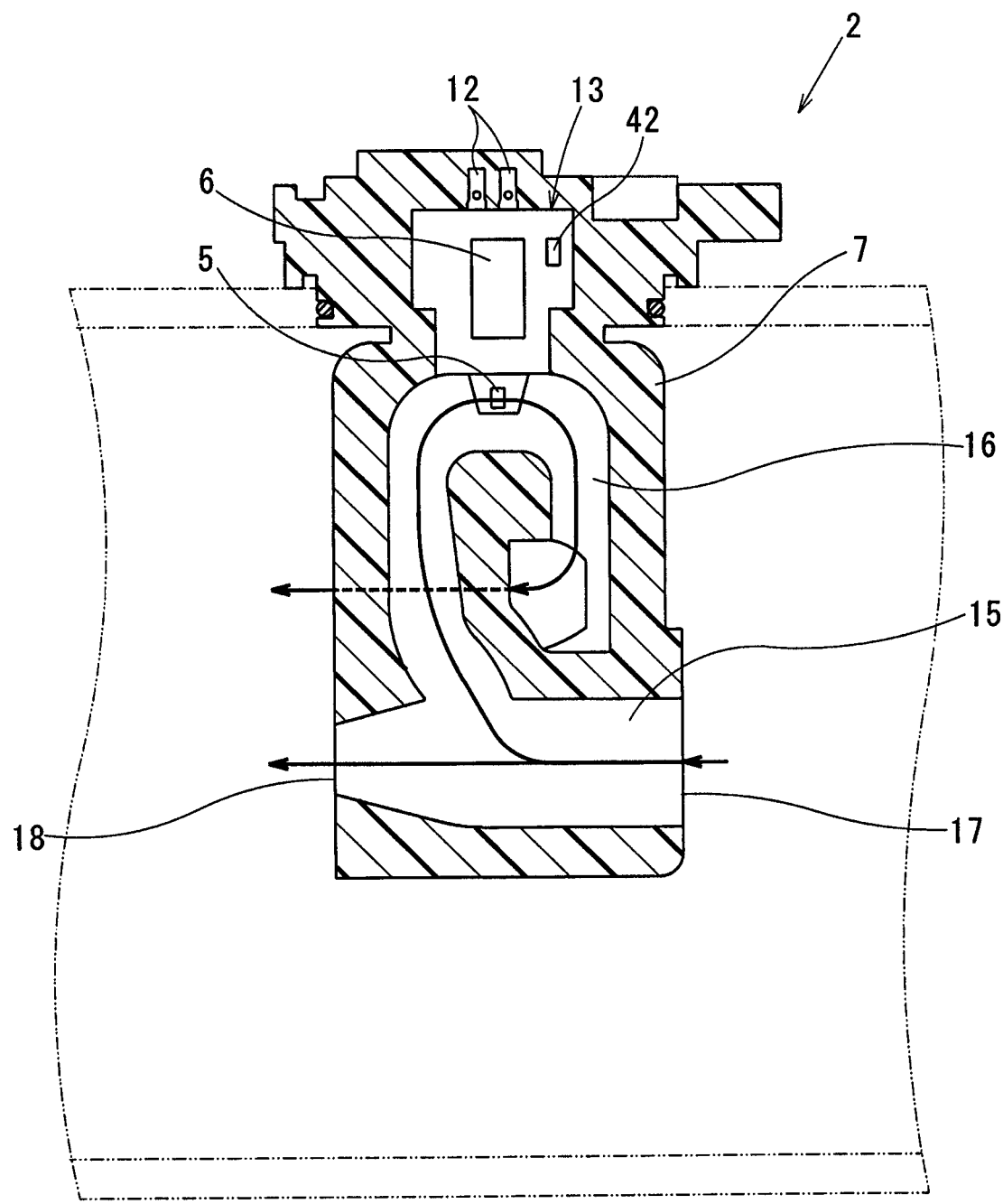
FIG. 5 is a diagram illustrating an internal configuration of a flow measuring device in accordance with the second embodiment.

A characteristic configuration of a communication system 1 of a second embodiment will be explained with a focus on its part different from the communication system 1 of the first embodiment. in the communication system 1 of the second embodiment, as illustrated in FIG. 4, an ECU 3 includes a transmitting part (control-side receiving part, control-side transmitting part) 41 for transmitting various signals by wireless communication, and transmits an engine information signal which is a signal indicating an operational state of the engine by the transmitting part 41. A flow measuring device 2 includes a receiving part (measurement-side transmitting part, measurement-side receiving part) 42 for receiving the various signals by wireless communication, and receives the engine information signal by the receiving part 42.

Furthermore, the flow measuring device 2 includes a correcting part 43 for correcting a flow rate signal based on the engine information signal, and transmits the corrected flow rate signal by wireless communication. The engine information signal is, for example, a signal indicating a rotation speed of the engine (hereinafter referred to as an engine rotation speed), the number of the cylinder where fuel is injected or ignited subsequently (hereinafter referred to as a subsequent cylinder number), or a load rate of the engine (hereinafter referred to as a load rate).

A characteristic configuration of the above description will be explained in detail below. The transmitting part 41 is a transceiver 41 (the transmitting part 41 may hereinafter be referred to as a transceiver 41) provided for the ECU 3, and has a function similar to the receiver 28 of the first embodiment in combination. Accordingly, an antenna, a receiving circuit, and a receive buffer of the transceiver 41 of the second embodiment are referred to as an antenna 37, a receiving circuit 38, and a receive buffer 39 respectively by giving the same reference numerals as the receiver 28 of the first embodiment.

Together with the antenna 37, the receiving circuit 38, and the receive buffer 39, the transceiver 41 includes a transmitting circuit 44, a modulation circuit 45, and an amplifying circuit 46 respectively similar to the transmitting circuit 33, the modulation circuit 34, and the amplifying circuit 35 which are provided for the flow measuring device 2 of the first embodiment. A CPU 25 obtains the engine rotation speed, the subsequent cylinder number, and the load rate based on the flow rate signal, a temperature signal, and a signal transmitted from an other measuring device 21.

The modulation circuit 45 modulates a carrier signal using the data on the engine rotation speed, the subsequent cylinder number, and the load rate sent from the CPU 25, and produces a transmission signal including the engine information signal. The carrier signal modulated by the modulation circuit 45 is a signal generated by the transmitting circuit 44. The amplifying circuit 46 amplifies the transmission signal generated at the modulation circuit 45, and the amplified transmission signal is transmitted by wireless communication through the antenna 37.

The receiving part 42 is a transceiver that is incorporated into an assembly 13 in the flow measuring device 2 (the receiving part 42 may hereinafter be referred to as a transceiver 42), and has a function similar to the transmitter 27 of the first embodiment in combination. Accordingly, an antenna, a transmitting circuit, a modulation circuit, and an amplifying circuit of the transceiver 42 of the second embodiment are referred to as an antenna 32, a transmitting circuit 33, a modulation circuit 34, and an amplifying circuit 35 respectively by giving the same reference numerals as the transmitter 27 of the first embodiment.

Together with the antenna 32, the transmitting circuit 33, the modulation circuit 34, and the amplifying circuit 35, the transceiver 42 includes a receiving circuit 48 and a receive buffer 49 respectively similar to the receiving circuit 38 and the receive buffer 39 provided for the ECU 3 of the first embodiment. The antenna 32 is connected to the receiving circuit 48, being matched with the same frequency as a transmitting frequency of the ECU 3. The antenna 32 receives the transmission signal transmitted from the ECU 3, and sends the signal to the receiving circuit 48.

Accordingly, the receiving circuit 48 takes out the data on information about the engine rotation speed, the subsequent cylinder number, and the load rate from the part of the received transmission signal including the engine information signal, and outputs the data to the receive buffer 49. The receive buffer 49 temporarily stores the data outputted from the receiving circuit 48, and the stored data is outputted to a processing circuit 11 according to instructions from the processing circuit 11.

In the processing circuit 11, an operation part functioning as the correcting part 43 is provided (the correcting part 43 may hereinafter be referred to as an operation part 43), and the receive buffer 49 outputs the data according to instructions from the operation part 43. The operation part 43 corrects the flow rate signal based on the data obtained from the receive buffer 49. Specifically, the operation part 43 corrects the flow rate signal based on the engine rotation speed, the subsequent cylinder number, and the load rate. In this case, the operation part 43 obtains data on flow rate output characteristics from a storage part 31, and also makes a correction to the flow rate signal based on the flow rate output characteristics. For this reason, a characteristic signal is not contained in the transmission signal from the transceiver 42.

Effects of the second embodiment will be described below. In the communication system 1 of the second embodiment, the flow measuring device 2 and the ECU 3 respectively include the transceivers 42, 41 that transmit and receive the signal by wireless communication. The ECU 3 transmits the engine information signal by the transceiver 41, and the flow measuring device 2 receives the engine information signal by the transceiver 42. The flow measuring device 2 makes a correction to the flow rate signal based on the engine information signal by the operation part 43, and transmits the corrected flow rate signal by the transceiver 42. Accordingly, the correction to the flow rate signal based on the operational state of the engine can be performed in the flow measuring device 2. As a result, a processing load in the CPU 25 of the ECU 3 can be reduced.

The modes of the present disclosure are not limited to the embodiments, and can be variously modified. For example, in the communication system 1 of the embodiments, the flow measuring device 2 includes the temperature sensor 30 that generates the temperature signal, and the flow rate signal and the temperature signal are included in the transmission signal transmitted from the flow measuring device 2 to the ECU 3, but the mode of the transmission signal from the flow measuring device 2 to the ECU 3 is not limited to such a mode.

For example, the flow measuring device 2 may include a humidity sensor that generates a humidity signal which is a signal in accordance with a humidity of intake air, and the humidity signal may be contained in the transmission signal from the flow measuring device 2 to the ECU 3. Furthermore, the flow measuring device 2 may include a pressure sensor that generates a pressure signal which is a signal in accordance with a pressure of intake air, and the pressure signal may be contained in the transmission signal from the flow measuring device 2 to the ECU 3. In addition, the flow measuring device 2 may include an oxygen concentration sensor that generates an oxygen concentration signal which is a signal in accordance with an oxygen concentration of intake air, and the oxygen concentration signal may be contained in the transmission signal from the flow measuring device 2 to the ECU 3.

In this case, terminals, harnesses, and input circuits needed at the time of transmission and reception of the humidity signal, the pressure signal, the oxygen concentration signal and so forth by wire communication are made unnecessary. Thus, a cost increase due to the increase in number of terminals, harnesses, and input circuits can be prevented.

To sum up, the communication system 1, the flow measuring device 2, and the control device 3 of the above embodiments may be described as follows.

A communication system 1 for a vehicle in a first aspect of the present disclosure includes a flow measuring device 2 and a control device 3. The flow measuring device 2 includes a flow sensor 5 that generates a flow rate signal which is a signal in accordance with a flow rate of intake air (intake air amount) drawn into an internal combustion engine. The flow measuring device 2 transmits the flow rate signal. The control device 3 receives the flow rate signal and performs at least one of injection control of fuel to be supplied to the engine and ignition control at each cylinder of the engine based on the received flow rate signal. The flow measuring device 2 further includes a measurement-side transmitting part 27, 42 that transmits various signals by wireless communication, and transmits the flow rate signal by the measurement-side transmitting part 27, 42. The control device 3 includes a control-side receiving part 28, 41 that receives the various signals by the wireless communication, and receives the flow rate signal by the control-side receiving part 28, 41.

As a result, the flow rate signal can be transmitted from the flow measuring device and received by the control device by wireless communication. Accordingly, noise generated by another device is not superimposed on the flow rate signal. Thus, such a configuration that noise is not superimposed on the flow rate signal can be provided in the communication system including the flow measuring device and the control device.

The flow measuring device 2 in a second aspect of the present disclosure further includes an other sensor 30 that generates signals which are respectively in accordance with various parameters other than the flow rate of intake air, and transmits the signals generated by the other sensor 30 through the measurement-side transmitting part 27, 42. The control device 3 receives the signals generated by the other sensor 30 through the control-side receiving part 28, 41.

The other sensor 30 in a third aspect of the present disclosure is at least one of a temperature sensor 30, a humidity sensor, a pressure sensor, and an oxygen concentration sensor that generate a temperature signal, a humidity signal, a pressure signal, and an oxygen concentration signal respectively in accordance with a temperature, a humidity, a pressure, and an oxygen concentration of intake air.

Accordingly, not only the flow rate signal but also signals in accordance with other parameters (e.g., temperature signal, humidity signal, pressure signal, and oxygen concentration signal) can be transmitted from the flow measuring device and received by the control device by wireless communication. As a result, despite the increase in number of signals that are to be transmitted from the flow measuring device to the control device, a cost increase due to the increase in number of terminals and harnesses can be prevented.

Moreover, all the signals can be received without providing an input circuit for each signal in the control device. Thus, even though the number of signals that are to be transmitted from the flow measuring device to the control device increases, a cost increase due to the increase in number of input circuits can be prevented.

The flow measuring device 2 in a fourth aspect of the present disclosure further includes a storage part 31 that stores a flow rate output characteristic which indicates a correlation between a value expressing a level of the flow rate signal and a value of the flow rate. The flow measuring device 2 transmits a characteristic signal indicating the flow rate output characteristic by the measurement-side transmitting part 27, 42. The control device 3 receives the characteristic signal by the control-side receiving part 28, 41.

Consequently, the control device can obtain the flow rate output characteristics for each individual piece of the flow measuring device. As a result, a more highly accurate numerical value for the intake air amount can be obtained for example, by correcting the flow rate signal based on the obtained flow rate output characteristics. Moreover, a highly accurate numerical value for the intake air amount can be obtained without storing the flow rate output characteristics for each individual piece of the flow measuring device on the control device-side. Accordingly, a highly accurate numerical value for the intake air amount can be obtained without using much of memory capacity of the control device for storage of the flow rate output characteristics.

In a fifth aspect of the present disclosure, the control device 3 further includes a control-side transmitting part 41 that transmits various signals by wireless communication, and transmits an engine information signal indicating an operational state of the engine by the control-side transmitting part 41. The flow measuring device 2 further includes a measurement-side receiving part 42 that receives the various signal by the wireless communication, and receives the engine information signal by the measurement-side receiving part 42. The flow measuring device 2 further includes a correcting part 43 that corrects the flow rate signal based on the engine information signal, and transmits the corrected flow rate signal by the measurement-side transmitting part 27, 42.

The engine information signal in a sixth aspect of the present disclosure is a signal indicating at least one of a rotation speed of the engine, a number of the cylinder where fuel is injected or ignited subsequently, and a load rate of the engine. Accordingly, the correction to the flow rate signal based on the operational state of the engine (e.g., engine rotation speed, the number of the cylinder where fuel is injected or ignited subsequently, and engine load rate) can be performed in the flow measuring device. As a result, a processing load of the control device can be reduced.

The flow measuring device 2 in an eighth aspect of the present disclosure transmits an identifying signal for identifying the flow measuring device 2 for each individual piece by the measurement-side transmitting part 27, 42. The identifying signal in a ninth aspect of the present disclosure is received by a reception destination 3 having the strongest communication intensity. As a consequence, for example, after repair or replacement of the flow measuring device is carried out in the vehicle, pairing between the flow measuring device and the control device can reliably be performed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system for a vehicle, comprising:
a flow measuring device including a flow sensor that generates a flow rate signal which is a signal in accordance with a flow rate of intake air drawn into an internal combustion engine, wherein the flow measuring device transmits the flow rate signal; and
a control device that receives the flow rate signal and performs at least one of injection control of fuel to be supplied to the engine and ignition control at each cylinder of the engine based on the received flow rate signal, wherein:
the flow measuring device further includes a measurement-side transmitting part that transmits various signals by wireless communication, and transmits the flow rate signal by the measurement-side transmitting part;
the control device includes a control-side receiving part that receives the various signals by the wireless communication, and receives the flow rate signal by the control-side receiving part;
the flow measuring device and the control device are provided in the vehicle;
the control device further includes a control-side transmitting part that transmits various signals by wireless communication, and transmits an engine information signal indicating an operational state of the engine by the control-side transmitting part;
the flow measuring device further includes a measurement-side receiving part that receives the various signals by the wireless communication, and receives the engine information signal by the measurement-side receiving part;
the flow measuring device further includes a correcting part that corrects the flow rate signal based on the engine information signal, and transmits the corrected flow rate signal by the measurement-side transmitting part; and
the engine information signal is a signal indicating at least one of a rotation speed of the engine, a number of the cylinder where fuel is injected or ignited subsequently, and a load rate of the engine.

2. The communication system according to claim 1, wherein:
the flow measuring device further includes another sensor that generates signals which are respectively in accordance with various parameters other than the flow rate of intake air, and transmits the signals generated by the other sensor through the measurement-side transmitting part; and
the control device receives the signals generated by the other sensor through the control-side receiving part.

3. The communication system according to claim 2, wherein the other sensor is at least one of a temperature sensor, a humidity sensor, a pressure sensor, and an oxygen concentration sensor that generate a temperature signal, a humidity signal, a pressure signal, and an oxygen concentration signal respectively in accordance with a temperature, a humidity, a pressure, and an oxygen concentration of intake air.

4. The communication system according to claim 1, wherein:
the flow measuring device further includes a storage part that stores a flow rate output characteristic which provides a correction to the flow rate signal;
the flow measuring device transmits a characteristic signal indicating the flow rate output characteristic by the measurement-side transmitting part; and
the control device receives the characteristic signal by the control-side receiving part.

5. A flow measuring device constituting the communication system recited in claim 1.

6. The flow measuring device according to claim 5, wherein:
the flow measuring device transmits an identifying signal for identifying the flow measuring device for each individual piece to perform the pairing with its corresponding control device by the measurement-side transmitting part, and
the identifying signal is received by a reception destination having the strongest communication intensity.

7. A controller constituting the communication system recited in claim 1.

8. The flow measuring device according to claim 1, wherein:
the flow measuring device further includes a temperature sensor configured to generate a temperature signal corresponding to a temperature of the intake air;
the measurement-side transmitting part is configured to transmit the temperature signal; and
the control-side receiving part of the control device is configured to receive the transmitted temperature signal.

9. The communication system according to claim 1, wherein:
the control device is configured to obtain the engine information signal based on a signal transmitted from a measuring device other than the flow measuring device and then transmit the engine information signal through the control-side transmitting part to the measurement-side receiving part of the flow measuring device.

10. A communication system for a vehicle, comprising:
a flow measuring device including a flow sensor that generates a flow rate signal which is a signal in accordance with a flow rate of intake air drawn into an internal combustion engine, wherein the flow measuring device transmits the flow rate signal; and
a control device that receives the flow rate signal and performs at least one of injection control of fuel to be supplied to the engine and ignition control at each cylinder of the engine based on the received flow rate signal, wherein:
the flow measuring device further includes a measurement-side transmitting part that transmits various signals by wireless communication, and transmits the flow rate signal by the measurement-side transmitting part;

the control device includes a control-side receiving part that receives the various signals by the wireless communication, and receives the flow rate signal by the control-side receiving part;

the flow measuring device and the control device are provided in the vehicle;

the control device further includes a control-side transmitting part that transmits various signals by wireless communication, and transmits an engine information signal indicating an operational state of the engine by the control-side transmitting part;

the flow measuring device further includes a measurement-side receiving part that receives the various signals by the wireless communication, and receives the engine information signal by the measurement-side receiving part;

the flow measuring device further includes a correcting part that corrects the flow rate signal based on the engine information signal, and transmits the corrected flow rate signal by the measurement-side transmitting part;

the engine information signal indicates a rotation speed of the engine, a number of a cylinder where fuel is injected, and/or or a load rate of the engine; and the control device is configured to obtain the engine information signal based on a signal transmitted from a measuring device other than the flow measuring device.

11. The communication system according to claim 10, wherein:

the flow measuring device further includes another sensor that generates signals which are respectively in accordance with various parameters other than the flow rate of intake air, and transmits the signals generated by the other sensor through the measurement-side transmitting part; and the control device receives the signals generated by the other sensor through the control-side receiving part.

12. The communication system according to claim 11, wherein the other sensor is at least one of a temperature sensor, a humidity sensor, a pressure sensor, and an oxygen concentration sensor that generate a temperature signal, a humidity signal, a pressure signal, and an oxygen concentration signal respectively in accordance with a temperature, a humidity, a pressure, and an oxygen concentration of intake air.

13. The communication system according to claim 10, wherein:

the flow measuring device further includes a storage part that stores a flow rate output characteristic which provides a correction to the flow rate signal;

the flow measuring device transmits a characteristic signal indicating the flow rate output characteristic by the measurement-side transmitting part; and the control device receives the characteristic signal by the control-side receiving part.

14. A flow measuring device constituting the communication system recited in claim 9.

15. The flow measuring device according to claim 14, wherein:

the flow measuring device transmits an identifying signal for identifying the flow measuring device for each individual piece to perform the pairing with its corresponding control device by the measurement-side transmitting part, and the identifying signal is received by a reception destination having the strongest communication intensity.

16. A controller constituting the communication system recited in claim 10.

17. The flow measuring device according to claim 10, wherein:

the flow measuring device further includes a temperature sensor configured to generate a temperature signal corresponding to a temperature of the intake air;

the measurement-side transmitting part is configured to transmit the temperature signal; and the control-side receiving part of the control device is configured to receive the transmitted temperature signal.

18. The communication system according to claim 10, wherein:

the control device is configured to transmit the engine information signal through the control-side transmitting part to the measurement-side receiving part of the flow measuring device.

\* \* \* \* \*